United States Patent
Seiler et al.

[11] 3,864,373
[45] Feb. 4, 1975

[54] MANUFACTURE OF TRIALKOXYSILYLAMINO COMPOUNDS

[75] Inventors: Claus-Dietrich Seiler, Rheinfelden; Hans-Joachim Vahlensieck, Wehr, Baden; Peter Gerhardt, Oberwihl, all of Germany

[73] Assignee: Dynamit Nobel Aktiengesellschaft, Troisdorf, Germany

[22] Filed: Dec. 7, 1972

[21] Appl. No.: 313,074

[30] Foreign Application Priority Data
Dec. 13, 1971 Germany............................ 2161716

[52] U.S. Cl.. 260/448.8 R, 106/287 SB, 117/135.1, 117/126 GN, 161/182, 161/193, 161/207, 161/DIG. 4, 260/448.2 E, 260/448.2 N
[51] Int. Cl............................ C07f 7/10, C07f 7/18
[58] Field of Search ............................ 260/448.8 R

[56] References Cited
UNITED STATES PATENTS

| | | | |
|---|---|---|---|
| 2,823,218 | 2/1958 | Speier et al. | 260/448.8 R X |
| 2,971,864 | 2/1961 | Speier | 260/448.8 R X |
| 3,033,815 | 5/1962 | Pike et al. | 260/448.8 R X |
| 3,355,424 | 11/1967 | Brown | 260/448.8 R X |
| 3,665,027 | 5/1972 | Reichel | 260/448.8 R |

*Primary Examiner*—Paul F. Shaver
*Attorney, Agent, or Firm*—Burgess, Dinklage & Sprung

[57] ABSTRACT

An alkoxysilylethylamino compound of the formula

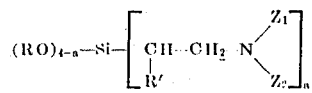

in which $a$ is 1, 2 or 3, R represents a lower substituted or unsubstituted alkyl radical, R' represents a substituted or unsubstituted alkyl radical which can be branched, $Z_1$ and $Z_2$ each represent hydrogen or alkyl, alkenyl, cycloalkyl or phenyl radicals, which radicals can be substituted or unsubstituted, and a process for preparing the same by reacting a hydrogen silane of the formula

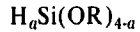

with a compound of the general formula

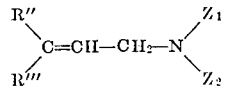

in which $Z_1$ and $Z_2$ have the same meanings as above and R'' and R''' represent hydrogen or alkyl radicals, in the presence of a catalyst comprising platinum.

14 Claims, No Drawings

MANUFACTURE OF TRIALKOXYSILYLAMINO COMPOUNDS

BACKGROUND OF THE INVENTION

1. Field of the Invention

This invention relates to the preparation of certain novel alkoxysilylethylamino compounds and especially compounds characterized by having a β-amino group with respect to the silicon atom. This invention further relates to providing new and useful aminosilyl compounds useful in adhesive compositions, especially those compositions used to bind inorganic surfaces together, particularly inorganic surfaces having an oxidic surface, e.g. sand and other silicious materials.

2. Discussion of the Prior Art

The manufacture of straight-chained aminoalkyltrialkoxysilanes by the reaction of the corresponding chlormethyl or γ-chloropropylsilanes with ammonia is known. This reaction, however, cannot be performed with β-chlorosilanes, because under the usual reaction conditions the Si—C bond cleaves, so that olefins and silicon compounds form as reaction products, which contain no Si—C bonds. For these reasons, it has hitherto been impossible to manufacture aminosilanes in which the amino group is in the β position with respect to the silicon atom.

SUMMARY OF THE INVENTION

Broadly, this invention contemplates an alkoxysilylethylamino compound of the formula

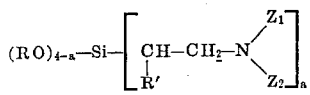

in which $a$ is 1, 2 or 3, R represents a lower substituted or unsubstituted alkyl radical, R' represents a substituted or unsubstituted alkyl radical which can be branched, $Z_1$ and $Z_2$ each represents hydrogen or alkyl, alkenyl, cycloalkyl or phenyl radicals, which radicals can be substituted or unsubstituted.

In a particularly desirable embodiment, this invention further contemplates producing such alkoxysilylethylamino compounds by contacting a hydrogen silane of the general formula

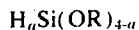

with a compound of the formula

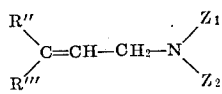

wherein R represents a lower alkyl radical, $a$ is a whole number between 1 and 3, R'' and R''' are each independently hydrogen or an alkyl radical, $Z_1$ and $Z_2$ are each independently hydrogen, alkyl, alkenyl, cycloalkyl or phenyl, in the presence of a catalyst comprising platinum.

In accordance with this invention numerous different alkoxysilylethylamino compounds can be produced. From the formula and from the description of the process, it is apparent that numerous different substituted and unsubstituted products can be performed. Thus, R is a lower alkyl radical which can be substituted or unsubstituted. Especially, it is a radical of from one to eight carbon atoms in the chain. Similarly, R' is a substituted or unsubstituted alkyl radical which can be branched. Preferably, it contains between one and eight carbon atoms in the chain. $Z_1$ and $Z_2$ represent hydrogen, phenyl, alkyl, alkenyl and cycloalkyl. If they represent an alkyl radical, the alkyl radical preferably contains between one and eight carbon atoms; if they represent an alkenyl radical, the alkenyl radical preferably between two and eight carbon atoms. If they represent a cycloalkyl, there are between five and eight carbon atoms in the ring.

Similarly, R'' and R''' can be hydrogen or alkyl radicals. If they are alkyl radicals, they satisfy the formula

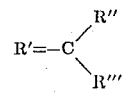

Thus, they preferably have a number of carbon atoms between one and five, as the total number of carbon atoms in the alkyl group constituting R' is preferably between one and eight carbon atoms. Naturally, when R'' and R''' are hydrogen, R' equals methyl.

With respect to the substitution of the various substituents, it is to be understood that alkyl groups can be branched or unbranched, that the substitution includes groups such as hydroxy, halo, cyano, mercapto, alkyl, alkenyl, alkoxy, thioalkoxy, aryl, nitro, nitroso, sulfate, carbonyl, thiocarbonyl, amide, amine, acetyl, sulfanyl, halide, phosphono, sulfonamide, sulfonyl, sulfo, and sulfono. Particularly contemplated organic substitutions are those wherein, in the case of saturated substituents, there are between one and eight carbon atoms in the chain. For unsaturated organic substituents, there are between two and eight carbon atoms in the chain.

DISCUSSION OF PREFERRED EMBODIMENTS

In accordance with the process of the present invention, allyl amines are preferred starting reactants. These amines contain an olefinic double bond. The hydrogen atoms of the amino group, however, can also be substituted by lower alkyl radicals, such as the methyl, ethyl, propyl or butyl radical, or the corresponding amines. Examples of such compounds are: N-methylallylamine, N-butylallylamine, N,N-dimethylallylamine, N-ethylamine-allylamine. The $C_3$ atom of the allyl amine can also be alkyl substituted, so that 1-amino-butene-(2) or 1-amino-3-methylbutene-(2), for example, may be used as starting products.

The hydrogen silanes used as starting products have the general formula $H_aSi(OR)_{4-a}$, in which $a$ or 2 or 3, and R represents a lower alkyl moiety. The alkyl moiety can contain between one and eight carbon atoms, preferably up to four carbon atoms. Trimethoxyhydrogensilane and triethoxyhydrogensilane are named as especially preferred compounds, but the corresponding dihydrogensilanes or butoxysilanes are also usable.

The ratio of the quantities of the two reactants is preferably made such that a slight molar excess of the unsaturated compound is used for each mole of the reactive hydrogen atom of the hydrogen silane. Accordingly, for each mole of a monohydrogen silane approximately 1.1 moles of the unsaturated compound are used. In the case of a dihydrogen silane the corresponding molar ratio amounts to 1 : 2.2 if both hydrogen atoms are to be substituted. The process can also be possible by substituting only one of the hydrogen atoms, in which case only about 1 mole of the unsaturated compound is used per mole of the dihydrogen silane.

The reaction takes place in the presence of platinum or platinum compounds as catalysts. Metallic platinum is used preferably in the form of platinum sponge; of the platinum compounds, $H_2PtCl_6 \cdot 6H_2O$ is an example of a simple platinum compound, and mesityl oxide-platinum dichloride is an example of a complex platinum compound. However, other platinum compounds also catalyze the reaction. Platinum can be in anionic or cationic form or in the form of an ion exchange resin. Other platinum containing catalysts which can be employed include the following: acetylacetone platinum dichloride.

In the reaction, the straight-chained $\gamma$-aminosilanes form in addition to the branched $\beta$-aminosilanes owing to the fact that one of the two carbon atoms located at the double bond takes the place of the hydrogen atom and thus forms the Si—C bond; the replaced hydrogen atom then attaches itself to the second carbon atom of the double bond.

The straight-chain aminosilanes differ from the branched $\beta$-aminosilanes in their boiling points, so that they can be separated by conventional distillation methods.

The reaction is exothermic and can be performed within a broad range of temperatures, generally between 60° C and the boiling point of the allylamine. The reaction temperature should not, however, exceed 300° C; the preferred temperature is the boiling temperature of the corresponding substituted or unsubstituted allylamine.

Aminosilanes having an amino group in the $\beta$ position with respect to the silicon atom have not been producible hitherto, so that the products manufactured by this process are hitherto unknown compounds. The products are very surface-reactive and, in spite of the $\beta$ position of the amino group, which for the reasons given above is not to be compared with an $\alpha$ or $\gamma$ position, they are used in applications in which surface-active aminosilanes are commonly used; they serve, for example, as adhesivizing agents between inorganic, oxidic surfaces and thermosetting resins, e.g. especially in the formation of sand cores. They are used in the same manner as materials such as gamma aminopropyl trimethoxysilanes.

It has been stated above that the organosilanes employed pursuant to the invention are used to bond organic substances to certain metallic or inorganic substances. Organic substances which can be bonded to the metallic or inorganic substances, pursuant to the invention, include all of the known thermoplastic and thermosetting polymers, including in particular polyaddition products such as epoxy resins, urethane resins, polyester resins, polyamides, polyimides, polyacetals, polymers in the acrylic family, polymers of olefins, especially alpha and conjugated diolefins, polycondensation products, such as coldsetting and/or thermosetting phenol aldehyde resins, and polymerization products e.g., polyvinyl chloride and/or copolymers of vinyl chloride and vinyl acetate. Additionally, there are contemplated condensation products of aldehydes with phenols as above mentioned and/or with furfuryl alcohol and/or urea. Condensation products that form in the pH range above 7 as well as those that form in the pH range below 7 can be used. Particularly suitable substances to be bonded include duruplastic materials as polyurethane resins, polyester resins or phenolic resins, and the like.

Examples of cold-setting resins are the condensation products that are obtained, for example, by the condensation of one mole of a phenol with 1 to 3 moles of an aldehyde in a preferably aqueous, alkaline medium, followed by distillation of the water in a vacuo down to a solid resin content of 60 to 80% and adjustment of the pH to values between 4 and 8, if desired. Phenol and its monocyclic homologs, such as the cresols and resorcinol, xylenols, or mixtures of these compounds, can be used as phenols. The aldehydes reacting with the phenols include, among others, formaldehyde, compounds which decompose to formaldehyde, such as paraformaldehyde, trioxane or hexamethylenetetramine, acetaldehyde and furfurol, and mixtures of these compounds.

Furthermore, co-condensation products of furfuryl alcohol, urea, phenol in some cases, and formaldehyde can be used as cold-setting resins. The individual components are present in the condensation in the following molar ratios:

| Phenols | 0.1 to 1.0 |
| Urea | 0.3 to 1.0 |
| Furfuryl alcohol | 0.1 to 1.0 |
| Formaldehyde | 2.0 to 4.0 |

The co-polycondensation of these compounds can be performed in an alkaline medium analogously to the condensation of the above-named phenol formaldehyde resins. In the copolycondensation of these compounds it has been found to be especially desirable to perform the condensation step-wise, total or partial quantities of the starting components being used in the individual steps.

As a starting component, the urea can be wholly or partially replaced by urea derivatives which are capable of reacting with aldehydes. Examples of such compounds are: thiourea, methyl and methylol urea, melamine, ammeline or benzoguanamine, and mixtures of these compounds.

Furfuryl alcohol can be replaced wholly or partially by furfurol, and formaldehyde can be replaced wholly or partially by other aldehydes already mentioned above.

Heat-setting resins which are used as binding agents for the mineral substances are mainly the resins known as novolaks. These are to be understood to be chiefly those resins which are obtained by acid and/or alkaline condensation of aldehydes with phenols, in a ratio of phenols to aldehydes of less than 1:1.

The condensation is generally performed by heating the phenol with the aldehyde in, for example, an acid medium, to temperatures between 60° and 100° C and performing the condensation at this temperature for a period between 1 and 4 hours. Then the water is distilled off by vacuum distillation until the desired solid resin content is reached. The resin obtained in this manner can, after cooling and crushing, be mixed with a hardener (preferably hexamethylenetetramine) and the silane, and then it can be mixed into the mineral substance, or it is added without silane to the mineral substance to whose surface the silane has been applied, or a solution of this resin preferably in alcohol is prepared, and the silane can be added to it, and then it is mixed together with the hardener into the mineral substance.

After the mixing of the resin with the mineral substance with the additon of the silanes used according to the invention, the mixture is made into formed bodies at elevated temperature in a known manner.

Examples of components having inorganic oxidic surfaces include in particular those materials which have a silicon or aluminum or titanium to oxygen bond. Examples of these inorganic oxidic surfaces include glass, quartz, diatomaceous earth, sand, clay, asbestos, mica, corundum, iron oxides, calcium carbonate, calcuim sulfate, and the like.

Suitable metal surfaces are especially iron, annealed iron, zinc, aluminum, tin and titanium. The inorganic components can be, for example, in the form of fibers, mats, rovings, powders, bats or fabrics or any other shape that presents a surface. Metals can be in the form of sheets, wires, and powders as well as other particulate shapes. Of especial technical interest are glass fibers, mats, and fibrous and metal sheets which are made into laminates with a wide variety of organic polymers. Especially contemplated are sand cores containing resins such as phenol-aldehyde, furfurolaldehyde and urea-aldehyde. Also contemplated are glass fiber reinforced substances.

In order to more fully illustrate the nature of the invention and the manner of practicing the same, the following examples are presented:

EXAMPLE 1

In a two-neccked flask with a superimposed dropping funnel and a reflux condenser, a mixture of 3.3 moles of allylamine (190 g) and 2 ml of a 0.1 × molar solution of mesityl oxideplatinum dichloride in acetone are placed, and 3 moles (492 g) of triethoxysilane are added drop by drop to this mixture over a period of 2 hours at the boiling temperature of the allylamine. The mixture was refluxed until the sump temperature reached approximately 135° C. The reaction mixture was thereupon subjected to a careful fractional distillation in vacuo. At a head temperature of 84° C and a pressure of 3 Torr, a fraction of 130 g was obtained which consisted essentially (95%) of α-methyl-β-amino-ethyltriethoxysilane, identified as such by elemental analysis and infrared spectroscopy.

EXAMPLE 2

3.3 moles of allylaminoethylamine (N-allylethylenediamine) (330 g), to which 3 ml of a catalyst solution (composed as described in Example 1) had been added, was placed in the apparatus described in Example 1 and 3 moles (366 g) of trimethoxysilane were added drop by drop over a period of 2 hours at a temperature of 100° C. The mixture was then refluxed until the sump temperature rose to about 175° C.

The fractionation of the crude mixture in vacuo (boiling range 108° to 112° C) yielded 420 g of a silane mixture, 25% of which consisted of the compound

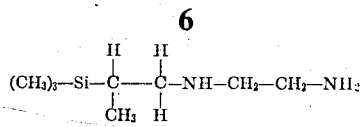

and 75% consisted of the compound $$(CH_3O)_3 - Si - CH_2 - CH_2 - CH_2 - NH - CH_2 - CH_2 - NH_2$$

on the basis of the gas chromatogram and the infrared spectogram. Both are useful in adhesive compositions and in the formation of sand cores.

The mixture was separated into the two components by subsequent fine distillation.

EXAMPLE 3

A cold-setting resin is prepared by first heating 164.5 g of phenol (100%), 1,200 g of formaldehyde (37% solution) and 420 g of urea for 15 minutes at 100° C. Then 844 g of formaldehyde (37% solution), 500 g of furfuryl alcohol and 4 g of sodium carbonate are added and condensed for another 75 minutes at 100° C. Then the water is distilled in vaccuo until the viscosity is brought to about 1,500 cP. The solid resin content amounts to about 60%.

2.0 g of this resin is mixed with 100 g of H 32 Haltern sand, 0.33 g of a 70% aqueous solution of $H_3PO_4$ as hardener, and an amount of γ-methyl-β-aminoethyl-triethoxysilane in an amount equivalent to about 0.2 weight percent based upon the weight of the resin. The same is formed into a sand core which has good strength values. Similarly, a sand core is prepared employing the silane of the first formula of Example 2. The sand core has good strength due to the use of this β-amino containing silane compound.

What is claimed is:

1. An alkoxysilylethylamino compound of the formula

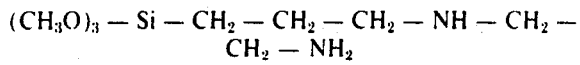

in which $a$ is 1, 2 or 3, R represents a lower substituted or unsubstituted alkyl radical of one to eight carbon atoms, R' represents a substituted or unsubstituted alkyl radical of one to eight carbon atoms, $Z_1$ and $Z_2$ each represent hydrogen or alkyl, alkenyl, cycloalkyl —$CH_2CH_2$—$NH_2$ or phenyl radicals.

2. A compound according to claim 1 characterized by the formula

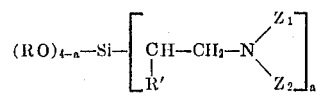

wherein R represents a methyl or ethyl moiety and Z either hydrogen or the grouping —$CH_2$—$CH_2NH_2$.

3. A compound according to claim 1 having the formula

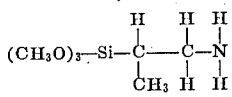

4. A compound according to claim 1 having the formula

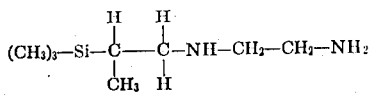

5. A process for the manufacture of a compound of the formula set forth in claim 1 which comprises contacting a hydrogen silane of the formula $$H_nSi(OR)_{4-n}$$

with a compound having the formula

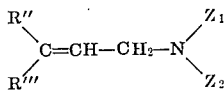

wherein R'' and R''' represents hydrogen or an alkyl group and $Z_1$ represents a hydrogen, alkyl, alkenyl, cycloalkyl —$CH_2CH_2NH_2$ or phenyl group and $Z_2$ represents an alkyl, alkenyl, cycloalkyl —$CH_2CH_2NH_2$ or phenyl group in the presence of mesityl oxide-platinum dichloride.

6. A process according to claim 5 wherein at least one of R'' and R''' is an alkyl radical of from 1 to 8 carbon atoms.

7. A process according to claim 5 wherein at least one of said $Z_1$ and $Z_2$ is the grouping —$CH_2$—$CH_2NH_2$.

8. A process according to claim 5 wherein the compound which is reacted with the hydrogen silane is selected from the group consisting of N-methylallyiaminne, N-butylallylamine, N,N-diethylallylamine, N-ethylamine-allylamine, a 1-aminebutene-(2) and 1-amino-3-methylbutene-(2).

9. A process for the preparation of a compound of claim 1 which comprises contacting allylamine with a hydrogen silane of the formula $H_nSi(OR)_{4-n}$ in the presence of mesityl oxide-platinum dichloride.

10. A process according to claim 5 wherein the hydrogen silane is selected from the group consisting of trimethoxy hydrogen silane, triethoxy hydrogen silane, dihydrogen dimethoxy hydrogen silane, diethoxy dihydrogen silane, tributoxy hydrogen silane, dibutoxy dihydrogen silane, tripropoxy hydrogen silane and dipropoxy dihydrogen silane.

11. A process according to claim 5 wherein there is a molar excess of a compound whose formula is

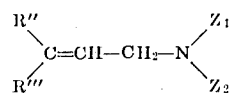

with respect to the hydrogen silane.

12. A process according to claim 11 wherein there are between 1 and 1.1 moles of a compound of the formula

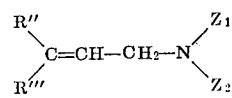

with respect to the hydrogensilane.

13. A process according to claim 11 wherein the reaction is carried out at a temperature between 60° C and the boiling point of the compound whose formula is set forth in claim 11.

14. A process according to claim 13 wherein the process is carried out at a temperature between 90° C and 300° C.

* * * * *

UNITED STATES PATENT OFFICE
CERTIFICATE OF CORRECTION

Patent No. 3,864,373  Dated February 4, 1975

Inventor(s) Claus-Dieter Seiler et al

It is certified that error appears in the above-identified patent and that said Letters Patent are hereby corrected as shown below:

Col. 5, line 38

"neccked" should read "necked"

Col. 6, line 2

"$(CH_3)_3$" should read "$(CH_3O)_3$"

Signed and Sealed this twenty-ninth Day of July 1975

[SEAL]

Attest:

RUTH C. MASON
Attesting Officer

C. MARSHALL DANN
Commissioner of Patents and Trademarks